(12) United States Patent
Yonezawa et al.

(10) Patent No.: US 11,230,280 B2
(45) Date of Patent: Jan. 25, 2022

(54) HYBRID VEHICLE AND METHOD OF CONTROLLING HYBRID VEHICLE

(71) Applicant: TOYOTA JIDOSHA KABUSHIKI KAISHA, Toyota (JP)

(72) Inventors: Koichi Yonezawa, Toyota (JP); Satoshi Yoshizaki, Gotenba (JP); Osamu Maeda, Toyota (JP); Daigo Ando, Nagoya (JP); Yoshikazu Asami, Gotenba (JP); Kenji Itagaki, Shizuoka-ken (JP); Shunsuke Oyama, Nagakute (JP); Koichiro Muta, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 146 days.

(21) Appl. No.: 16/811,212

(22) Filed: Mar. 6, 2020

(65) Prior Publication Data
US 2020/0290590 A1    Sep. 17, 2020

(30) Foreign Application Priority Data

Mar. 14, 2019 (JP) .............................. JP2019-047180

(51) Int. Cl.
*B60W 20/10* (2016.01)
*B60W 10/08* (2006.01)
*B60W 10/06* (2006.01)

(52) U.S. Cl.
CPC ............ *B60W 20/10* (2013.01); *B60W 10/06* (2013.01); *B60W 10/08* (2013.01); *B60W 2510/0638* (2013.01); *B60W 2710/0666* (2013.01); *B60W 2710/0677* (2013.01)

(58) Field of Classification Search
CPC ...... B60W 20/10; B60W 20/15; B60W 10/08; B60W 10/06; B60W 2710/0666; B60W 2510/0638; B60W 2710/0677; B60W 2710/083; B60W 2710/0644; B60W 30/1843; B60W 30/1882; B60K 6/445; F02D 29/02; F02D 29/06; F02D 31/001; F02D 2250/18
See application file for complete search history.

(56) References Cited

U.S. PATENT DOCUMENTS

| | | | |
|---|---|---|---|
| 2012/0208672 A1* | 8/2012 | Sujan | B60W 10/26 477/5 |
| 2017/0217302 A1* | 8/2017 | Imamura | B60K 6/48 |
| 2018/0162350 A1* | 6/2018 | Kim | F02N 11/04 |
| 2018/0215372 A1* | 8/2018 | Hosokawa | B60W 30/18127 |
| 2019/0184968 A1* | 6/2019 | Jang | B60K 6/485 |
| 2020/0290590 A1* | 9/2020 | Yonezawa | B60W 30/1882 |

FOREIGN PATENT DOCUMENTS

JP    2015-058924 A    3/2015

\* cited by examiner

*Primary Examiner* — George C Jin
(74) *Attorney, Agent, or Firm* — Sughrue Mion, PLLC

(57) ABSTRACT

An HV-ECU performs processing including calculating requested system power, calculating requested engine power when an engine activation request has been issued, obtaining a turbo temperature, setting an operating point on a predetermined operating line when the turbo temperature is equal to or lower than a threshold value Ta, setting as the operating point, a position on a higher rotation speed side by a predetermined value along an equal power line when the turbo temperature is higher than the threshold value Ta, carrying out engine control, and carrying out MG control.

6 Claims, 9 Drawing Sheets

HYBRID VEHICLE AND METHOD OF CONTROLLING HYBRID VEHICLE

This nonprovisional application is based on Japanese Patent Application No. 2019-047180 filed with the Japan Patent Office on Mar. 14, 2019, the entire contents of which are hereby incorporated by reference.

BACKGROUND

Field

The present disclosure relates to control of a hybrid vehicle incorporating a motor and an engine including a turbo charger as drive sources.

Description of the Background Art

A hybrid vehicle that incorporates a motor and an engine as drive sources, includes a power storage charged with motive power of the engine, and runs with motive power of the engine has conventionally been known. Some engines mounted on such a hybrid vehicle include a turbo charger. For example, Japanese Patent Laying-Open No. 2015-58924 discloses a hybrid vehicle incorporating a motor and an engine including a turbo charger.

SUMMARY

In the hybrid vehicle described above, however, a temperature of exhaust increases due to activation of the engine in particular in a high engine torque region, and a component constituting the turbo charger such as a turbine through which exhaust flows is heated. Therefore, depending on a temperature of the component, for protection of the component, the engine may not be operated as desired. Consequently, the power storage cannot sufficiently be charged or driving force requested of the vehicle cannot be generated, which may lead to poor drivability of the vehicle.

An object of the present disclosure is to provide a hybrid vehicle that achieves suppressed deterioration in drivability while overheating of a turbo charger is suppressed and a method of controlling a hybrid vehicle.

A hybrid vehicle according to one aspect of the present disclosure includes an engine including a turbo charger, a motor generator that generates electric power by using motive power of the engine, a power divider that divides motive power output from the engine into motive power to be transmitted to the motor generator and motive power to be transmitted to a drive wheel, an obtaining device that obtains a temperature of the turbo charger, and a controller that controls the engine and the motor generator based on the temperature of the turbo charger. When the temperature of the turbo charger does not exceed a threshold value, the controller sets as an operating point, a position on a predetermined operating line where engine power requested of the engine is output, the predetermined operating line being set on a coordinate plane of engine torque and an engine rotation speed. When the temperature of the turbo charger exceeds the threshold value, the controller sets as the operating point, a position changed from the position set on the predetermined operating line toward a higher rotation speed side along an equal power line of engine power. The controller controls the engine and the motor generator for the engine to operate at the set operating point.

Thus, when the temperature of the turbo charger exceeds a threshold value and a high-temperature state is set, a position changed from the position on the predetermined operating line where requested engine power is output toward the higher rotation speed side along the equal power line is set as the operating point. Therefore, as compared with an example where a position on the predetermined operating line is set as the operating point, the engine rotation speed increases and engine torque is lowered. Consequently, increase in temperature of exhaust can be suppressed and hence increase in temperature of the turbo charger can be suppressed. Thus, requested engine power is output while overheating of the turbo charger is suppressed and hence deterioration in drivability of the vehicle can be suppressed.

In one embodiment, the controller sets the operating point to increase a rotation speed of the engine as the temperature of the turbo charger is higher.

Thus, as the temperature of the turbo charger is higher, the engine rotation speed increases and engine torque is lowered. Consequently, increase in temperature of exhaust can be suppressed and hence increase in temperature of the turbo charger can be suppressed.

Furthermore, in one embodiment, when the engine rotation speed corresponding to the position changed toward the higher rotation speed side exceeds an upper limit value, the controller sets as the operating point, a position changed from the position set on the predetermined operating line toward a lower torque side with the rotation speed of the engine being equal.

Thus, engine torque is lowered while the engine rotation speed exceeding the upper limit value is suppressed. Consequently, increase in temperature of exhaust can be suppressed and hence increase in temperature of the turbo charger can be suppressed.

A hybrid vehicle according to another aspect of the present disclosure includes an engine including a turbo charger, a first motor generator that generates electric power by using motive power of the engine, a power divider that divides motive power output from the engine into motive power to be transmitted to the first motor generator and motive power to be transmitted to a drive wheel, a second motor generator that transmits motive power to the drive wheel, an obtaining device that obtains a temperature of the turbo charger, and a controller that controls the engine, the first motor generator, and the second motor generator based on the temperature of the turbo charger. When the temperature of the turbo charger does not exceed a threshold value, the controller sets as an operating point, a position on a predetermined operating line where engine power requested of the engine is output, the predetermined operating line being set on a coordinate plane of engine torque and an engine rotation speed. When the temperature of the turbo charger exceeds the threshold value, the controller sets as the operating point, a position changed from the position set on the predetermined operating line toward a lower torque side with the engine rotation speed being equal. The controller controls the engine and the first motor generator for the engine to operate at the set operating point. The controller compensates for shortage in driving force corresponding to lowering in engine torque from the position set on the predetermined operating line to the operating point by using the second motor generator.

Thus, when the temperature of the turbo charger exceeds a threshold value and a high-temperature state is set, engine torque is lowered. Consequently, increase in temperature of exhaust can be suppressed and hence increase in temperature of the turbo charger can be suppressed. Thus, deterioration in drivability of the vehicle can be suppressed by compensation for shortage in driving force by the second motor generator while overheating of the turbo charger is suppressed.

A method of controlling a hybrid vehicle according to yet another aspect of the present disclosure is a method of controlling a hybrid vehicle, the hybrid vehicle including an engine including a turbo charger, a motor generator that generates electric power by using motive power of the engine, and a power divider that divides motive power output from the engine into motive power to be transmitted to the motor generator and motive power to be transmitted to a drive wheel. The method includes obtaining a temperature of the turbo charger, when the temperature of the turbo charger does not exceed a threshold value, setting as an operating point, a position on a predetermined operating line where engine power requested of the engine is output, the predetermined operating line being set on a coordinate plane of engine torque and an engine rotation speed, when the temperature of the turbo charger exceeds the threshold value, setting as the operating point, a position changed from the position set on the predetermined operating line toward a higher rotation speed side along an equal power line of engine power, and controlling the engine and the motor generator for the engine to operate at the set operating point.

A method of controlling a hybrid vehicle according to yet another aspect of the present disclosure is a method of controlling a hybrid vehicle, the hybrid vehicle including an engine including a turbo charger, a first motor generator that generates electric power by using motive power of the engine, a power divider that divides motive power output from the engine into motive power to be transmitted to the first motor generator and motive power to be transmitted to a drive wheel, and a second motor generator that transmits motive power to the drive wheel. The method includes obtaining a temperature of the turbo charger, when the temperature of the turbo charger does not exceed a threshold value, setting as an operating point, a position on a predetermined operating line where engine power requested of the engine is output, the predetermined operating line being set on a coordinate plane of engine torque and an engine rotation speed, when the temperature of the turbo charger exceeds the threshold value, setting as the operating point, a position changed from the position set on the predetermined operating line toward a lower torque side with the engine rotation speed being equal, controlling the engine and the first motor generator for the engine to operate at the set operating point, and compensating for shortage in driving force corresponding to lowering in engine torque from the position set on the predetermined operating line to the operating point by using the second motor generator.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
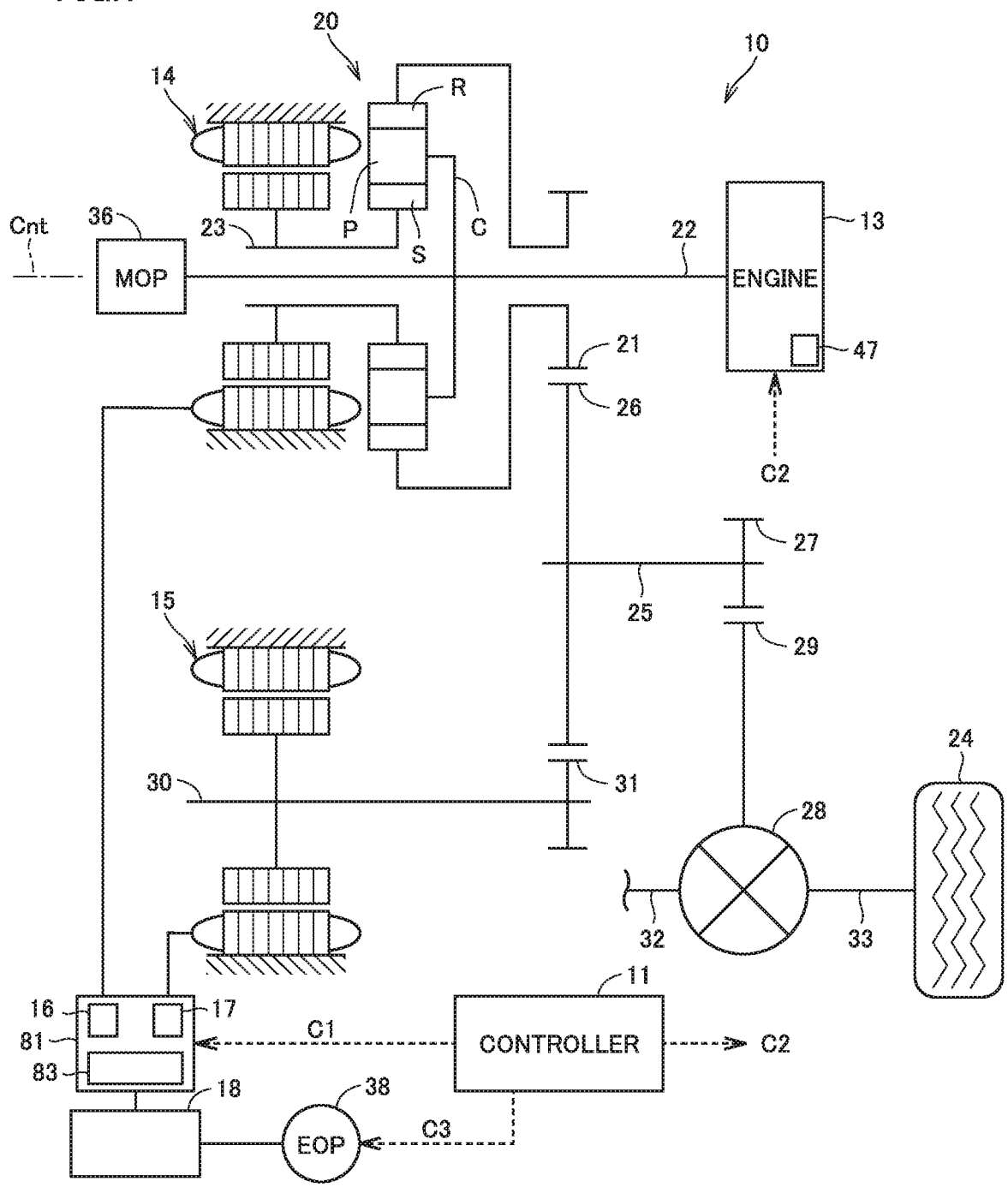
FIG. 1 is a diagram showing an exemplary configuration of a drive system of a hybrid vehicle.

An embodiment of the present disclosure will be described in detail below with reference to the drawings. The same or corresponding elements in the drawings have the same reference characters allotted and description thereof will not be repeated.

First Embodiment

As to Drive System of Hybrid Vehicle

FIG. 1 is a diagram showing an exemplary configuration of a drive system of a hybrid vehicle (which is simply denoted as a vehicle below) 10. As shown in FIG. 1, vehicle 10 includes as a drive system, a controller 11 as well as an engine 13, a first motor generator (which is denoted as a first MG below) 14, and a second motor generator (which is denoted as a second MG below) 15 that serve as motive power sources for running. Engine 13 includes a turbo charger 47. First MG 14 and second MG 15 each perform a function as a motor that outputs torque by being supplied with driving electric power and a function as a generator that generates electric power by being supplied with torque. An alternating current (AC) rotating electric machine is employed for first MG 14 and second MG 15. The AC rotating electric machine includes, for example, a permanent magnet synchronous motor including a rotor having a permanent magnet embedded.

First MG 14 and second MG 15 are electrically connected to a battery 18 with a power control unit (PCU) 81 being interposed. PCU 81 includes a first inverter 16 that supplies and receives electric power to and from first MG 14, a second inverter 17 that supplies and receives electric power to and from second MG 15, battery 18, and a converter 83 that supplies and receives electric power to and from first inverter 16 and second inverter 17.

For example, converter 83 can up-convert electric power from battery 18 and supply up-converted electric power to first inverter 16 or second inverter 17. Alternatively, converter 83 can down-convert electric power supplied from first inverter 16 or second inverter 17 and supply down-converted electric power to battery 18.

First inverter 16 can convert direct current (DC) power from converter 83 into AC power and supply AC power to first MG 14. Alternatively, first inverter 16 can convert AC power from first MG 14 into DC power and supply DC power to converter 83.

Second inverter 17 can convert DC power from converter 83 into AC power and supply AC power to second MG 15. Alternatively, second inverter 17 can convert AC power from second MG 15 into DC power and supply DC power to converter 83.

PCU 81 charges battery 18 with electric power generated by first MG 14 or second MG 15 or drives first MG 14 or second MG 15 with electric power from battery 18.

Battery 18 includes, for example, a lithium ion secondary battery or a nickel metal hydride secondary battery. The lithium ion secondary battery is a secondary battery in which lithium is adopted as a charge carrier, and may include not only a general lithium ion secondary battery containing a liquid electrolyte but also what is called an all-solid-state battery containing a solid electrolyte. Battery 18 should only be a power storage that is at least rechargeable, and for example, an electric double layer capacitor may be employed instead of the secondary battery.

Engine 13 and first MG 14 are coupled to a planetary gear mechanism 20. Planetary gear mechanism 20 transmits drive torque output from engine 13 by splitting drive torque into drive torque to first MG 14 and drive torque to an output gear 21, and represents an exemplary power divider in the embodiment of the present disclosure. Planetary gear mechanism 20 includes a single-pinion planetary gear mechanism and is arranged on an axis Cnt coaxial with an output shaft 22 of engine 13.

Planetary gear mechanism 20 includes a sun gear S, a ring gear R arranged coaxially with sun gear S, a pinion gear P meshed with sun gear S and ring gear R, and a carrier C holding pinion gear P in a rotatable and revolvable manner. Output shaft 22 is coupled to carrier C. A rotor shaft 23 of first MG 14 is coupled to sun gear S. Ring gear R is coupled to output gear 21. Output gear 21 represents one of output elements for transmitting drive torque to a drive wheel 24.

In planetary gear mechanism 20, carrier C to which drive torque output from engine 13 is transmitted serves as an input element, ring gear R that outputs drive torque to output gear 21 serves as an output element, and sun gear S to which rotor shaft 23 is coupled serves as a reaction force element. Planetary gear mechanism 20 divides motive power output from engine 13 into motive power on a side of first MG 14 and motive power on a side of output gear 21. First MG 14 is controlled to output torque in accordance with an engine rotation speed.

A countershaft 25 is arranged in parallel to axis Cnt. Countershaft 25 is attached to a driven gear 26 meshed with output gear 21. A drive gear 27 is attached to countershaft 25, and drive gear 27 is meshed with a ring gear 29 in a differential gear 28 representing a final reduction gear. A drive gear 31 attached to a rotor shaft 30 in second MG 15 is meshed with driven gear 26. Therefore, drive torque output from second MG 15 is added to drive torque output from output gear 21 in a part of driven gear 26. Drive torque thus combined is transmitted to drive wheel 24 with driveshafts 32 and 33 extending laterally from differential gear 28 being interposed. As drive torque is transmitted to drive wheel 24, driving force is generated in vehicle 10.

A mechanical oil pump (which is denoted as an MOP below) 36 is provided coaxially with output shaft 22. MOP 36 delivers lubricating oil with a cooling function, for example, to planetary gear mechanism 20, first MG 14, second MG 15, and differential gear 28. Vehicle 10 further includes an electric oil pump (which is denoted as an EOP below) 38. EOP 38 is driven by electric power supplied from battery 18 when operation of engine 13 is stopped, and it delivers lubricating oil to planetary gear mechanism 20, first MG 14, second MG 15, and differential gear 28 in a manner the same as or similar to MOP 36.

As to Configuration of Engine

Figure 2:
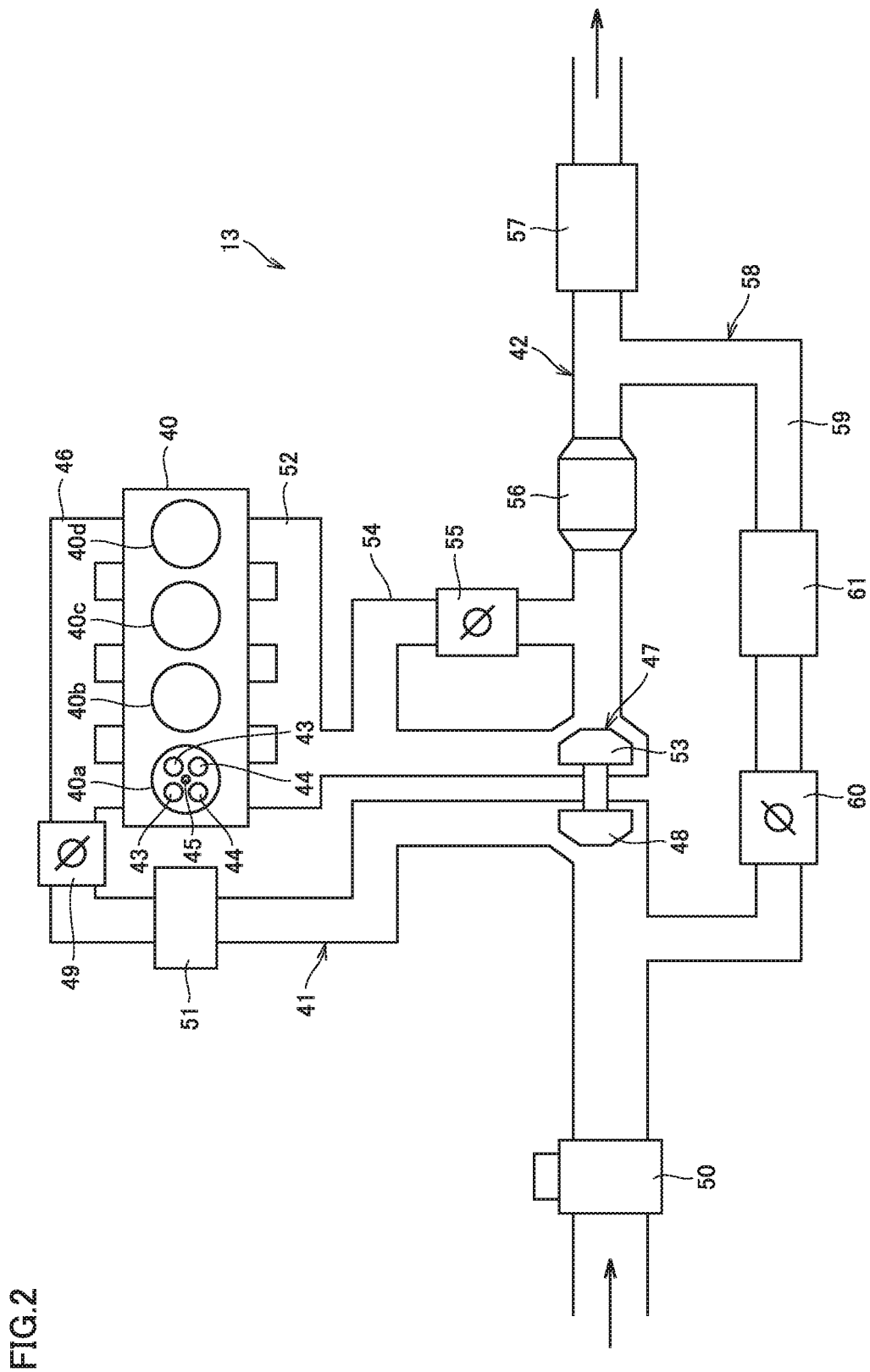
FIG. 2 is a diagram showing an exemplary configuration of an engine including a turbo charger.

FIG. 2 is a diagram showing an exemplary configuration of engine 13 including turbo charger 47. Engine 13 is, for example, an in-line four-cylinder spark ignition internal combustion engine. As shown in FIG. 2, engine 13 includes, for example, an engine main body 40 formed with four cylinders 40a, 40b, 40c, and 40d being aligned in one direction.

One ends of intake ports and one ends of exhaust ports formed in engine main body 40 are connected to cylinders 40a, 40b, 40c, and 40d. One end of the intake port is opened and closed by two intake valves 43 provided in each of cylinders 40a, 40b, 40c, and 40d, and one end of the exhaust port is opened and closed by two exhaust valves 44 provided in each of cylinders 40a, 40b, 40c and 40d. The other ends of the intake ports of cylinders 40a, 40b, 40c, and 40d are connected to an intake manifold 46. The other ends of the exhaust ports of cylinders 40a, 40b, 40c, and 40d are connected to an exhaust manifold 52.

In the present embodiment, engine 13 is, for example, a direct injection engine and fuel is injected into each of cylinders 40a, 40b, 40c, and 40d by a fuel injector (not shown) provided at the top of each cylinder. An air fuel mixture of fuel and intake air in cylinders 40a, 40b, 40c, and 40d is ignited by an ignition plug 45 provided in each of cylinders 40a, 40b, 40c, and 40d.

FIG. 2 shows intake valve 43, exhaust valve 44, and ignition plug 45 provided in cylinder 40a and does not show intake valve 43, exhaust valve 44, and ignition plug 45 provided in other cylinders 40b, 40c, and 40d.

Engine 13 is provided with turbo charger 47 that uses exhaust energy to boost suctioned air. Turbo charger 47 includes a compressor 48 and a turbine 53.

An intake air passage 41 has one end connected to intake manifold 46 and the other end connected to an air inlet. Compressor 48 is provided at a prescribed position in intake air passage 41. An air flow meter 50 that outputs a signal in accordance with a flow rate of air that flows through intake air passage 41 to controller 11 is provided between the other end (air inlet) of intake air passage 41 and compressor 48. An intercooler 51 that cools intake air pressurized by compressor 48 is disposed in intake air passage 41 provided downstream from compressor 48. An intake throttle valve (throttle valve) 49 that can regulate a flow rate of intake air that flows through intake air passage 41 is provided between intercooler 51 and one end of intake air passage 41.

An exhaust passage 42 has one end connected to exhaust manifold 52 and the other end connected to a muffler (not shown). Turbine 53 is provided at a prescribed position in exhaust passage 42. In exhaust passage 42, a bypass passage 54 that bypasses exhaust upstream from turbine 53 to a portion downstream from turbine 53 and a waste gate valve 55 provided in the bypass passage and capable of regulating a flow rate of exhaust guided to turbine 53 are provided. Therefore, a flow rate of exhaust that flows into turbine 53, that is, a boost pressure of suctioned air, is regulated by controlling a position of waste gate valve 55. Exhaust that passes through turbine 53 or waste gate valve 55 is purified by a start-up converter 56 and an aftertreatment apparatus 57 provided at prescribed positions in exhaust passage 42, and thereafter emitted into the atmosphere. Aftertreatment apparatus 57 contains, for example, a three-way catalyst.

Engine 13 is provided with an exhaust gas recirculation (EGR) apparatus 58 that has exhaust flow into intake air passage 41. EGR apparatus 58 includes an EGR passage 59, an EGR valve 60, and an EGR cooler 61. EGR passage 59 allows some of exhaust to be taken out of exhaust passage 42 as EGR gas and guides EGR gas to intake air passage 41. EGR valve 60 regulates a flow rate of EGR gas that flows through EGR passage 59. EGR cooler 61 cools EGR gas that flows through EGR passage 59. EGR passage 59 connects a portion of exhaust passage 42 between start-up converter 56 and aftertreatment apparatus 57 to a portion of intake air passage 41 between compressor 48 and air flow meter 50.

As to Configuration of Controller

Figure 3:
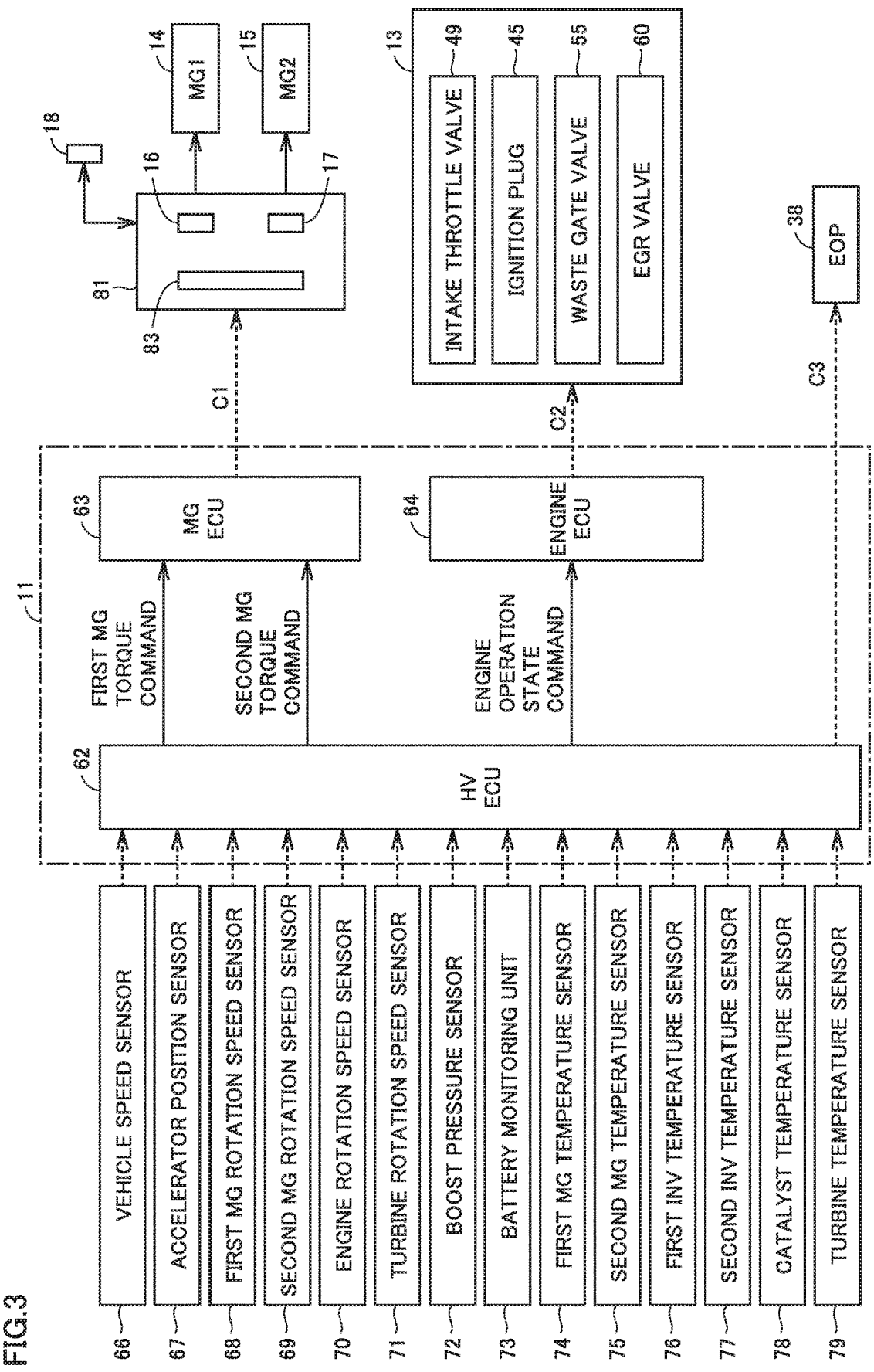
FIG. 3 is a block diagram showing an exemplary configuration of a controller.

FIG. 3 is a block diagram showing an exemplary configuration of controller 11. As shown in FIG. 3, controller 11 includes a hybrid vehicle (HV)-electronic control unit (ECU) 62, an MG-ECU 63, and an engine ECU 64.

HV-ECU 62 is a controller that controls engine 13, first MG 14, and second MG 15 in coordination. MG-ECU 63 is a controller that controls an operation by PCU 81. Engine ECU 64 is a controller that controls an operation by engine 13.

HV-ECU 62, MG-ECU 63, and engine ECU 64 each include an input and output apparatus that supplies and receives signals to and from various sensors and other ECUs that are connected, a storage that serves for storage of various control programs or maps (including a read only memory (ROM) and a random access memory (RAM)), a central processing unit (CPU) that executes a control program, and a counter that counts time.

A vehicle speed sensor 66, an accelerator position sensor 67, a first MG rotation speed sensor 68, a second MG rotation speed sensor 69, an engine rotation speed sensor 70, a turbine rotation speed sensor 71, a boost pressure sensor 72, a battery monitoring unit 73, a first MG temperature sensor 74, a second MG temperature sensor 75, a first INV temperature sensor 76, a second INV temperature sensor 77, a catalyst temperature sensor 78, and a turbine temperature sensor 79 are connected to HV-ECU 62.

Vehicle speed sensor 66 detects a speed of vehicle 10 (vehicle speed). Accelerator position sensor 67 detects an amount of pressing of an accelerator pedal (accelerator position). First MG rotation speed sensor 68 detects a rotation speed of first MG 14. Second MG rotation speed sensor 69 detects a rotation speed of second MG 15. Engine rotation speed sensor 70 detects a rotation speed of output shaft 22 of engine 13 (engine rotation speed). Turbine rotation speed sensor 71 detects a rotation speed of turbine 53 of turbo charger 47. Boost pressure sensor 72 detects a boost pressure of engine 13. First MG temperature sensor 74 detects an internal temperature of first MG 14 such as a temperature associated with a coil or a magnet. Second MG temperature sensor 75 detects an internal temperature of second MG 15 such as a temperature associated with a coil or a magnet. First INV temperature sensor 76 detects a temperature of first inverter 16 such as a temperature associated with a switching element. Second INV temperature sensor 77 detects a temperature of second inverter 17 such as a temperature associated with a switching element. Catalyst temperature sensor 78 detects a temperature of aftertreatment apparatus 57. Turbine temperature sensor 79 detects a temperature of turbine 53. Various sensors output signals indicating results of detection to HV-ECU 62.

Battery monitoring unit 73 obtains a state of charge (SOC) representing a ratio of a remaining amount of charge to a full charge capacity of battery 18 and outputs a signal indicating the obtained SOC to HV-ECU 62.

Battery monitoring unit 73 includes, for example, a sensor that detects a current, a voltage, and a temperature of battery 18. Battery monitoring unit 73 obtains an SOC by calculating the SOC based on the detected current, voltage, and temperature of battery 18.

Various known approaches such as an approach by accumulation of current values (coulomb counting) or an approach by estimation of an open circuit voltage (OCV) can be adopted as a method of calculating an SOC.

As to Control of Running of Vehicle

Vehicle 10 configured as above can be set or switched to such a running mode as a hybrid (HV) running mode in which engine 13 and second MG 15 serve as motive power sources and an electric (EV) running mode in which the vehicle runs with engine 13 remaining stopped and second MG 15 being driven by electric power stored in battery 18. Setting of and switching to each mode is made by HV-ECU 62. HV-ECU 62 controls engine 13, first MG 14, and second MG 15 based on the set or switched running mode.

The EV running mode is selected, for example, in a low-load operation region where a vehicle speed is low and requested driving force is low, and refers to a running mode in which an operation by engine 13 is stopped and second MG 15 outputs driving force.

The HV running mode is selected in a high-load operation region where a vehicle speed is high and requested driving force is high, and refers to a running mode in which combined torque of drive torque of engine 13 and drive torque of second MG 15 is output.

In the HV running mode, in transmitting drive torque output from engine 13 to drive wheel 24, first MG 14 applies reaction force to planetary gear mechanism 20. Therefore, sun gear S functions as a reaction force element. In other words, in order to apply engine torque to drive wheel 24, first MG 14 is controlled to output reaction torque against engine torque. In this case, regenerative control in which first MG 14 functions as a generator can be carried out.

Control of engine 13, first MG 14, and second MG 15 in coordination while vehicle 10 operates will be described below.

HV-ECU 62 calculates requested driving force based on an accelerator position determined by an amount of pressing of the accelerator pedal. HV-ECU 62 calculates requested running power of vehicle 10 based on the calculated requested driving force and a vehicle speed. HV-ECU 62 calculates a value resulting from addition of requested charging and discharging power of battery 18 to requested running power as requested system power.

HV-ECU 62 determines whether or not activation of engine 13 has been requested in accordance with calculated requested system power. HV-ECU 62 determines that activation of engine 13 has been requested, for example, when requested system power exceeds a threshold value. When activation of engine 13 has been requested, HV-ECU 62 sets the HV running mode as the running mode. When activation of engine 13 has not been requested, HV-ECU 62 sets the EV running mode as the running mode.

When activation of engine 13 has been requested (that is, when the HV running mode is set), HV-ECU 62 calculates power requested of engine 13 (which is denoted as requested engine power below). For example, HV-ECU 62 calculates requested system power as requested engine power. For example, when requested system power exceeds an upper limit value of requested engine power, HV-ECU 62 calculates the upper limit value of requested engine power as requested engine power. HV-ECU 62 outputs calculated requested engine power as an engine operation state command to engine ECU 64.

Engine ECU 64 transmits a control signal C2 based on the engine operation state command input from HV-ECU 62 and variously controls each component of engine 13 such as intake throttle valve 49, ignition plug 45, waste gate valve 55, and EGR valve 60.

HV-ECU 62 sets based on calculated requested engine power, an operating point of engine 13 in a coordinate system defined by an engine rotation speed and engine torque. HV-ECU 62 sets, for example, an intersection between an equal power line equal in output to requested engine power in the coordinate system and a predetermined operating line as the operating point of engine 13.

The predetermined operating line represents a trace of variation in engine torque with variation in engine rotation speed in the coordinate system, and it is set, for example, by adapting the trace of variation in engine torque high in fuel efficiency through experiments.

HV-ECU 62 sets the engine rotation speed corresponding to the set operating point as a target engine rotation speed.

As the target engine rotation speed is set, HV-ECU 62 sets a torque command value for first MG 14 for setting a current engine rotation speed to the target engine rotation speed. HV-ECU 62 sets the torque command value for first MG 14, for example, through feedback control based on a difference between a current engine rotation speed and the target engine rotation speed.

HV-ECU 62 calculates engine torque to be transmitted to drive wheel 24 based on the set torque command value for first MG 14 and sets a torque command value for second MG 15 so as to fulfill requested driving force. HV-ECU 62 outputs set torque command values for first MG14 and second MG 15 as a first MG torque command and a second MG torque command to MG-ECU 63.

MG-ECU 63 calculates a current value corresponding to torque to be generated by first MG 14 and second MG 15 and a frequency thereof based on the first MG torque command and the second MG torque command input from HV-ECU 62, and outputs a control signal C1 including the calculated current value and the frequency thereof to PCU 81.

HV-ECU 62 further transmits a control signal C3 based on an operation state including the running mode to EOP 38 and controls drive of EOP 38.

HV-ECU 62 may request increase in boost pressure, for example, when the accelerator position exceeds a threshold value for starting turbo charger 47, when requested engine power exceeds a threshold value, or when engine torque corresponding to the set operating point exceeds a threshold value.

Though FIG. 3 illustrates a configuration in which HV-ECU 62, MG-ECU 63, and engine ECU 64 are separately provided by way of example, the ECUs may be integrated as a single ECU.

As to Relation Between Temperature of Turbo Charger and Control of Running of Vehicle In vehicle 10 including turbo charger 47 configured as above, a temperature of exhaust increases by an operation of the engine in particular in a high engine torque region, and a component constituting turbo charger 47 such as turbine 53 through which exhaust flows is heated. This is because of increase in combustion energy and increase in amount of generated heat with increase in boost pressure. Therefore, depending on a temperature of the component, for protection of the component, engine 13 may not be operated as desired. Consequently, battery 18 cannot sufficiently be charged or driving force requested of vehicle 10 cannot be generated, which may lead to poor drivability of vehicle 10.

In the present embodiment, HV-ECU 62 is assumed to operate as below. Specifically, when a temperature of turbo charger 47 is lower than a threshold value, HV-ECU 62 sets as an operating point, a position on a predetermined operating line set on a coordinate plane of engine torque and an engine rotation speed where engine power requested of engine 13 is output. When the temperature of turbo charger 47 exceeds the threshold value, HV-ECU 62 sets as the operating point, a position changed from the position set on the predetermined operating line toward a higher rotation speed side along an equal power line of requested engine power.

By doing so, when the temperature of turbo charger 47 exceeds the threshold value and a high-temperature state is set, the position changed from the position on the predetermined operating line where requested engine power is output toward the higher rotation speed side along the equal power line is set as the operating point. Therefore, as compared with an example where the position on the predetermined operating line is set as the operating point, the engine rotation speed increases and engine torque is lowered. Consequently, increase in temperature of exhaust can be suppressed and hence increase in temperature of turbo charger 47 can be suppressed. Thus, requested engine power is output while overheating of turbo charger 47 is suppressed and deterioration in drivability of vehicle 10 can be suppressed.

As to Processing Performed by HV-ECU 62

Figure 4:
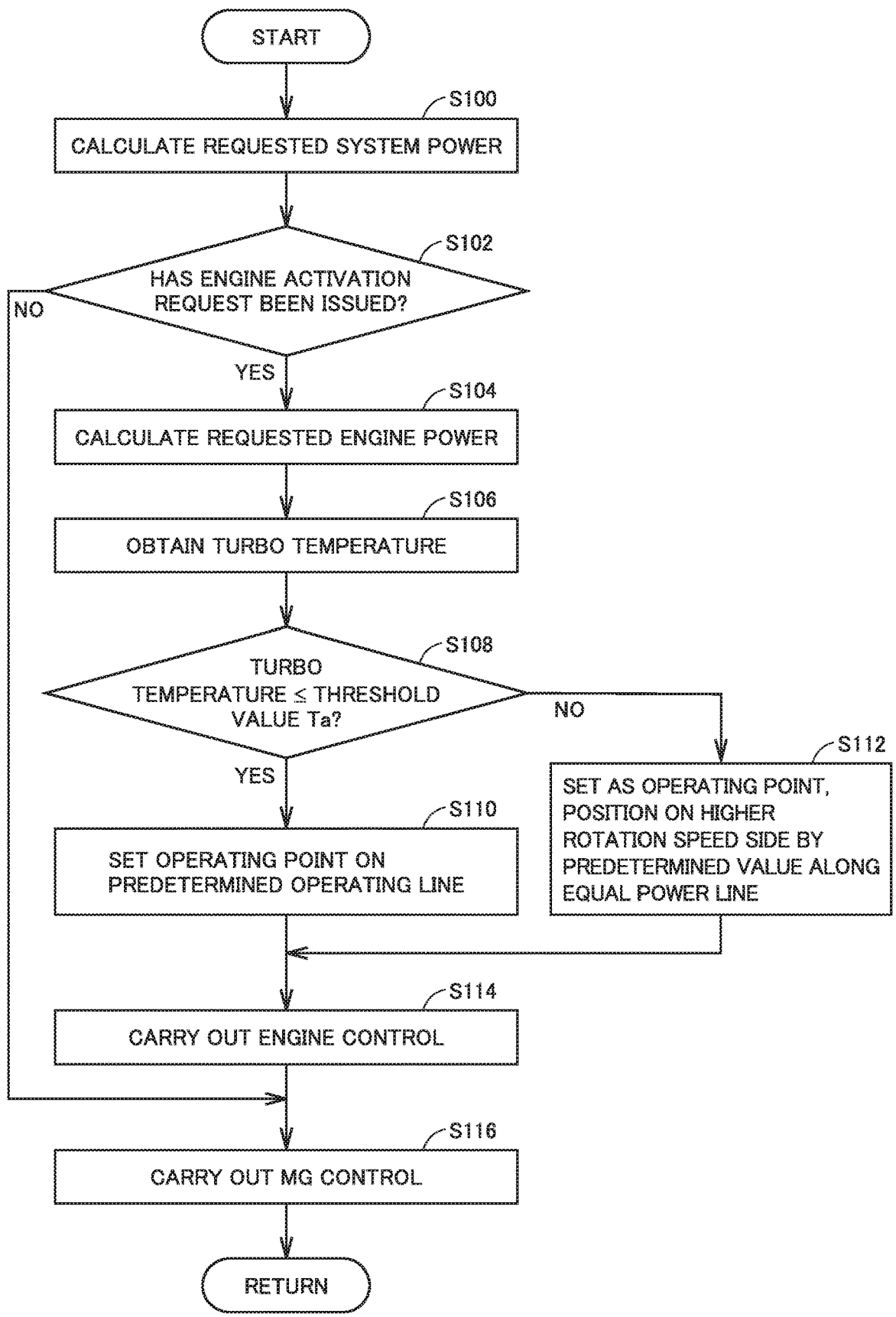
FIG. 4 is a flowchart showing exemplary processing performed by an HV-ECU.

Processing performed by HV-ECU 62 will be described below with reference to FIG. 4. FIG. 4 is a flowchart showing exemplary processing performed by HV-ECU 62.

In a step (a step being denoted as S below) 100, HV-ECU 62 calculates requested system power.

In S102, HV-ECU 62 determines whether or not a request for activation of engine 13 has been issued. When it is determined that the request for activation of engine 13 has been issued (YES in S102), the process proceeds to S104.

In S104, HV-ECU 62 calculates requested engine power. HV-ECU 62 calculates, for example, requested system power described above as requested engine power.

Since a method of calculating requested system power, a method of determining issuance of a request for activation of engine 13, and a method of calculating requested engine power are as described above, detailed description thereof will not be repeated.

In S106, HV-ECU 62 obtains a temperature of turbo charger 47 (which is denoted as a turbo temperature below). HVW-ECU 62 may obtain, for example, a temperature of the turbine detected by turbine temperature sensor 79 as a turbo temperature. Alternatively, HV-ECU 62 may calculate an estimated value of the turbo temperature based on an amount of intake air, an amount of injected fuel, an engine rotation speed, a boost pressure, or a history of variation thereof and obtain the calculated estimated value as the turbo temperature.

In S108, HV-ECU 62 determines whether or not the turbo temperature is equal to or lower than a threshold value Ta. Threshold value Ta is a temperature threshold value for determining whether or not turbo charger 47 has been overheated, and it is set in advance through experiments or based on a temperature which a component constituting turbo charger 47 (for example, a component constituting compressor 48, a component constituting turbine 53, a component constituting waste gate valve 55, or a component such as a shaft that constitutes a coupling that couples compressor 48 and turbine 53 to each other) can withstand (for example, a minimum value of temperatures which the components can withstand).

HV-ECU 62 may set threshold value Ta, for example, by correcting a value (an initial value) set in advance based on a deterioration state based on a period of use of turbo charger 47 (for example, a total operation period of engine 13 or a total duration for which a boost pressure is equal to or higher than a threshold value) or a history of loads (for example, a total rotation speed of turbo charger 47). Alternatively, for example, when a degree of deterioration is equal to or higher than a threshold value, HV-ECU 62 may set as threshold value Ta, a value lower than a value (an initial value) set in a brand new condition or a value lower as a degree of deterioration is higher. When the turbo temperature is determined as being equal to or lower than threshold value Ta (YES in S108), the process proceeds to S110.

In S110, HV-ECU 62 sets the operating point on the predetermined operating line. Specifically, HV-ECU 62 sets an intersection between the equal power line of requested engine power and the predetermined operating line as the operating point. Since the equal power line and the predetermined operating line are as described above, detailed description thereof will not be repeated. When the turbo temperature is higher than threshold value Ta (NO in S108), the process proceeds to S112.

In S112, HV-ECU 62 sets as the operating point, a position moved by a predetermined value from the position of the intersection between the equal power line of requested engine power and the predetermined operating line toward the higher rotation speed side with output being equal. The predetermined value is set at least to suppress increase in turbo temperature. The predetermined value may be set, for example, to set an engine rotation speed that achieves engine torque at which a boost pressure is equal to or lower than a threshold value. The predetermined value may be set in accordance with a position of the intersection between the equal power line of requested engine power and the predetermined operating line.

In S114, HV-ECU 62 carries out engine control. Specifically, HV-ECU 62 generates an engine operation state command such that requested engine power is output. HV-ECU 62 outputs a signal indicating the generated engine operation state command to engine ECU 64. Though engine control is carried out in S114 after the operating point is set in S110 or S112 in the description of the present embodiment, engine control should only be carried out at least after requested engine power is calculated in S104 and engine control may be carried out before the operating point is set. When it is determined that a request for activation of engine 13 has not been issued (NO in S102), the process proceeds to S116.

In S116, HV-ECU 62 carries out MG control. Specifically, HV-ECU 62 sets an engine rotation speed corresponding to the set operating point as the target engine rotation speed. HV-ECU 62 generates a torque command value for first MG14 as a first MG torque command such that the engine rotation speed attains to the set target engine rotation speed. HV-ECU 62 outputs the generated first MG torque command to MG-ECU 63.

HV-ECU 62 calculates engine torque to be transmitted to drive wheel 24 based on the torque command value for first MG 14 and generates a torque command value for second MG 15 as the second MG command so as to fulfill requested driving force (that is, so as to generate driving force corresponding to a difference between driving force corresponding to engine torque to be transmitted to drive wheel 24 and requested driving force). HV-ECU 62 outputs the generated second MG torque command to MG-ECU 63. When a request for activation of engine 13 has not been issued, HV-ECU 62 sets a torque command value for second MG 15 as the second MG torque command such that requested driving force is generated only by second MG 15.

As to Exemplary Operation by HV-ECU 62

Figure 5:
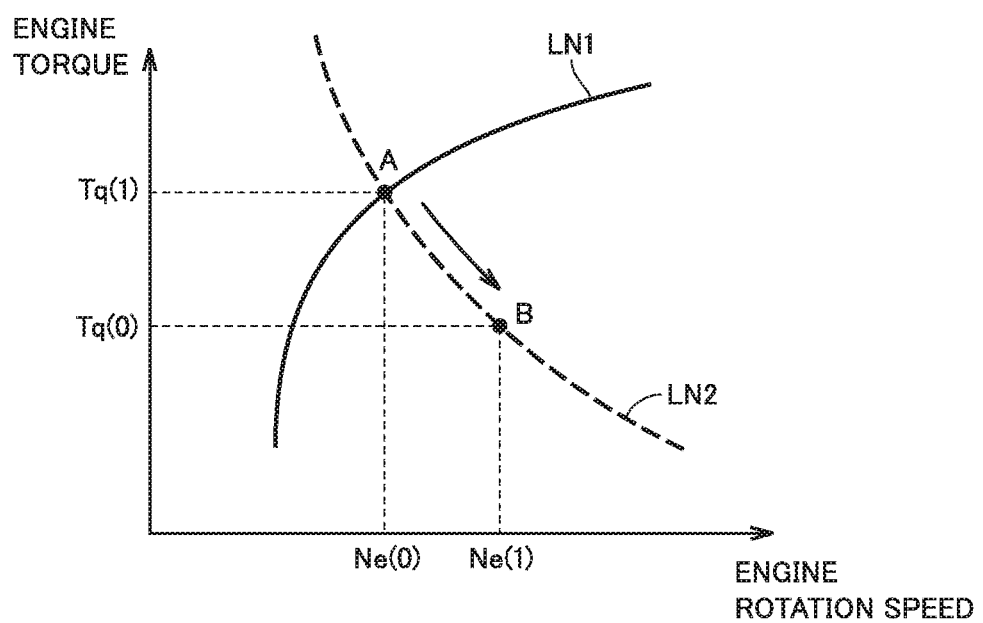
FIG. 5 is a diagram for illustrating an exemplary operation by the HV-ECU.

An operation by HV-ECU 62 according to the present embodiment based on the structure and the flowchart as set forth above will be described with reference to FIG. 5. FIG. 5 is a diagram for illustrating an exemplary operation by HV-ECU 62. The ordinate in FIG. 5 represents engine torque. The abscissa in FIG. 5 represents an engine rotation speed. FIG. 5 shows a predetermined operating line LN1 (a solid line). FIG. 5 shows an equal power line of (exemplary) requested engine power LN2 (a dashed line). Requested system power is assumed to be constant for the sake of convenience of description.

When requested system power is calculated (S100) and when it is determined that a request for activation of engine 13 has been issued as calculated requested system power has exceeded the threshold value (YES in S102), requested engine power is calculated (S104) and a turbo temperature is obtained (S106).

When the obtained turbo temperature is determined as being equal to or lower than threshold value Ta (YES in S108), an intersection A on the predetermined operating line (LN1 in FIG. 5) with the equal power line (LN2 in FIG. 5) of requested engine power is set as the operating point (S110). Specifically, intersection A at which the engine rotation speed attains to Ne(0) and engine torque attains to Tq(1) in the coordinate plane of engine torque and the engine rotation speed is set as the operating point.

Then, engine control is carried out based on requested engine power (S114) and MG control is carried out (S116) as the first MG torque command is generated such that the engine rotation speed attains to Ne(0) set as the target engine rotation speed and the second MG torque command is generated such that requested driving force is generated together with engine torque to be transmitted to drive wheel 24.

When an operation state of engine 13 in the high engine torque region continues, the temperature of exhaust increases and the turbo temperature increases. Consequently, when the obtained turbo temperature is determined as being higher than threshold value Ta (NO in S108), a point B on a higher rotation speed side along the equal power line (LN2 in FIG. 5) than intersection A on the predetermined operating line is set as the operating point (S112). In other words, point B at which the engine rotation speed attains to Ne(1) higher by a predetermined value than Ne(0) and engine torque attains to Tq(0) in the coordinate plane of engine torque and the engine rotation speed is set as the operating point.

Then, engine control is carried out based on requested engine power (S114) and MG control is carried out based on the set operating point (S116).

When point B is set as the operating point, engine torque output from engine 13 is lower than when intersection A is set as the operating point. Since increase in temperature of exhaust is consequently suppressed, increase in temperature of turbo charger 47 is suppressed.

As to Function and Effect

As set forth above, according to the hybrid vehicle in the present embodiment, when the turbo temperature exceeds threshold value Ta and the high-temperature state is set, a position changed from the position on the predetermined operating line where requested engine power is output toward the higher rotation speed side along the equal power line is set as the operating point. Therefore, as compared with an example in which the position on the predetermined operating line is set as the operating point, the engine rotation speed increases and engine torque is lowered. Consequently, a boost pressure of turbo charger 47 is lowered and hence increase in temperature of exhaust of engine 13 can be suppressed. Requested engine power is thus output while overheating of the turbo charger is suppressed and deterioration in drivability of the vehicle can be suppressed. Therefore, a hybrid vehicle that achieves suppressed deterioration in drivability while overheating of the turbo charger is suppressed and a method of controlling a hybrid vehicle can be provided.

As to Modification of First Embodiment

A modification of the first embodiment will be described below.

In the embodiment described above, when the turbo temperature exceeds threshold value Ta, a position on the higher rotation speed side by a predetermined value along the equal power line is set as the operating point. When the turbo temperature exceeds threshold value Ta, however, the operating point may be set, for example, such that as the turbo temperature is higher, a degree of increase in engine rotation speed increases with the position on the predetermined operating line being defined as the reference. By doing so, as the turbo temperature is higher, the engine rotation speed increases and engine torque is lowered. Therefore, increase in temperature of turbo charger 47 can be suppressed.

Though intake throttle valve 49 is described as being provided between intercooler 51 and intake manifold 46 in the embodiment above, it may be provided, for example, in intake air passage 41 between compressor 48 and air flow meter 50.

In the embodiment described above, when the turbo temperature exceeds threshold value Ta, a position on the higher rotation speed side by a predetermined value along the equal power line is set as the operating point. For example, when the engine rotation speed exceeds the upper limit value by setting a position on the higher rotation speed side by a predetermined value along the equal power line as the operating point, however, a position changed from the position set on the predetermined operating line toward the lower torque side with the engine rotation speed being equal may be set as the operating point.

Figure 6:
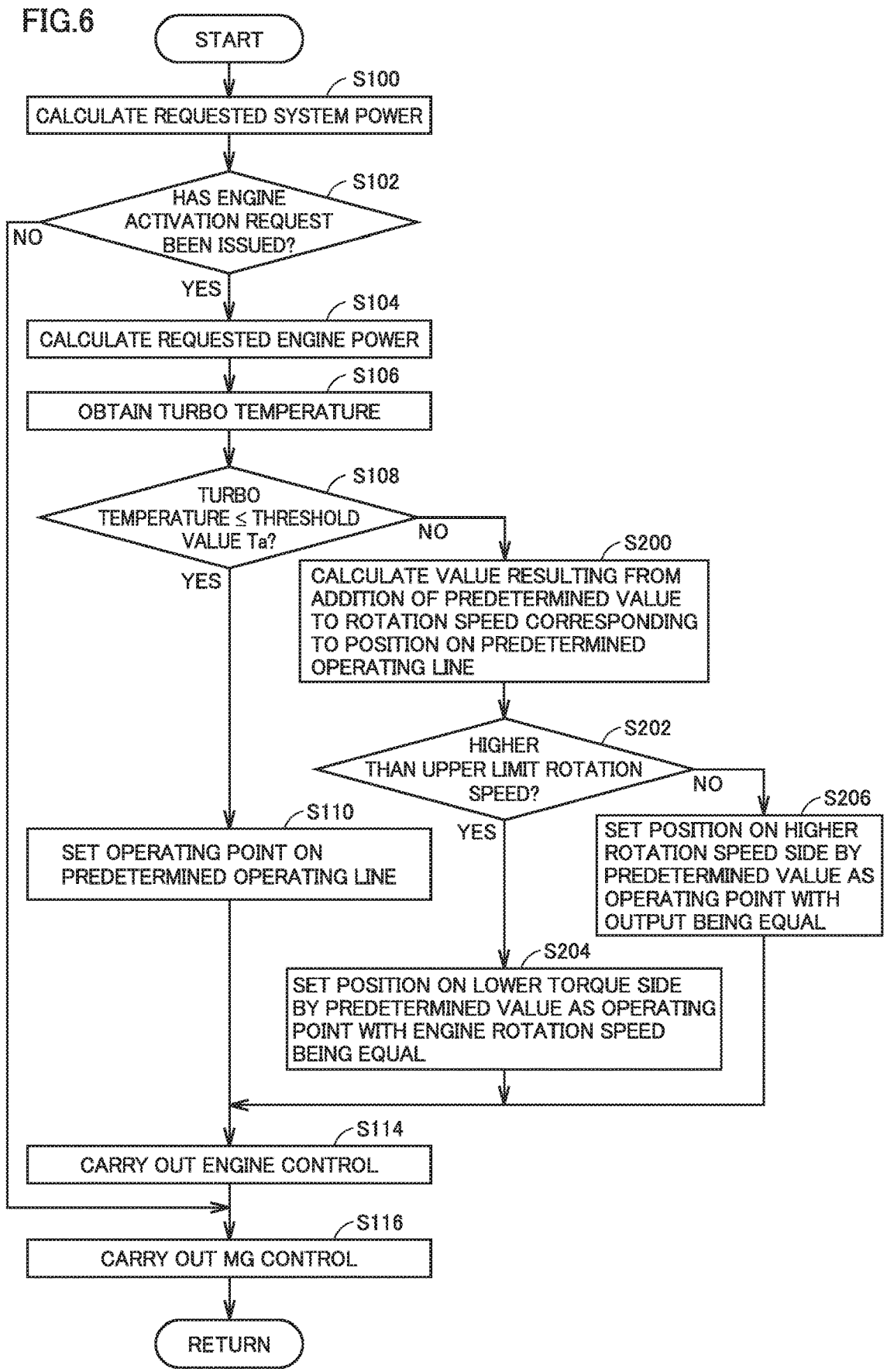
FIG. 6 is a flowchart showing exemplary processing performed by the HV-ECU in a modification.

Processing performed by HV-ECU 62 in this modification will be described below with reference to FIG. 6. FIG. 6 is a flowchart showing exemplary processing performed by HV-ECU 62 in the modification.

Processing in S100, S102, S104, S106, S108, S110, S114, and S116 in the flowchart in FIG. 6 is similar to processing in S100, S102, S104, S106, S108, S110, S114, and S116 in the flowchart in FIG. 4 except for contents described below. Therefore, detailed description of such processing will not be repeated.

When the turbo temperature is determined as being higher than threshold value Ta in S108 (NO in S108), the process proceeds to S200.

In S200, HV-ECU 62 calculates a value resulting from addition of a predetermined amount to an engine rotation speed corresponding to a position on the predetermined operating line (that is, an intersection between the predetermined operating line and an equal power line of requested engine power).

In S202, whether or not the value calculated in S200 exceeds an upper limit rotation speed is determined. The upper limit rotation speed is predetermined and it may be an upper limit value of the engine rotation speed set as specifications of engine 13, an upper limit value of the engine rotation speed set to prevent first MG 14 from entering an overspeed state, an upper limit value of the engine rotation speed set to prevent pinion gear P from entering an overspeed state, or a minimum value of upper limit values of various engine rotation speeds described above. When the value calculated in S200 is determined as exceeding the upper limit rotation speed (YES in S202), the process proceeds to S204.

In S204, HV-ECU 62 sets as the operating point, a position changed from the position on the predetermined operating line toward the lower torque side with the engine rotation speed being equal. HV-ECU 62 sets as the operating point, for example, a position lower in engine torque by a predetermined value than the intersection between the predetermined operating line and the equal power line of requested engine power. The predetermined value is set at least to suppress increase in turbo temperature. The predetermined value may be set, for example, to achieve engine torque at which a boost pressure is equal to or lower than the threshold value. Alternatively, the predetermined value may be set in accordance with a position of the intersection between the equal power line of requested engine power and the predetermined operating line. When the value calculated in S200 is determined as not exceeding the upper limit value (NO in S202), the process proceeds to S206.

In S206, HV-ECU 62 sets as the operating point, a position moved toward the higher rotation speed side by a predetermined value from the intersection between the equal power line of requested engine power and the predetermined operating line with output being equal. Since specific processing is the same as the processing in S112 in FIG. 4, detailed description thereof will not be repeated.

Figure 7:
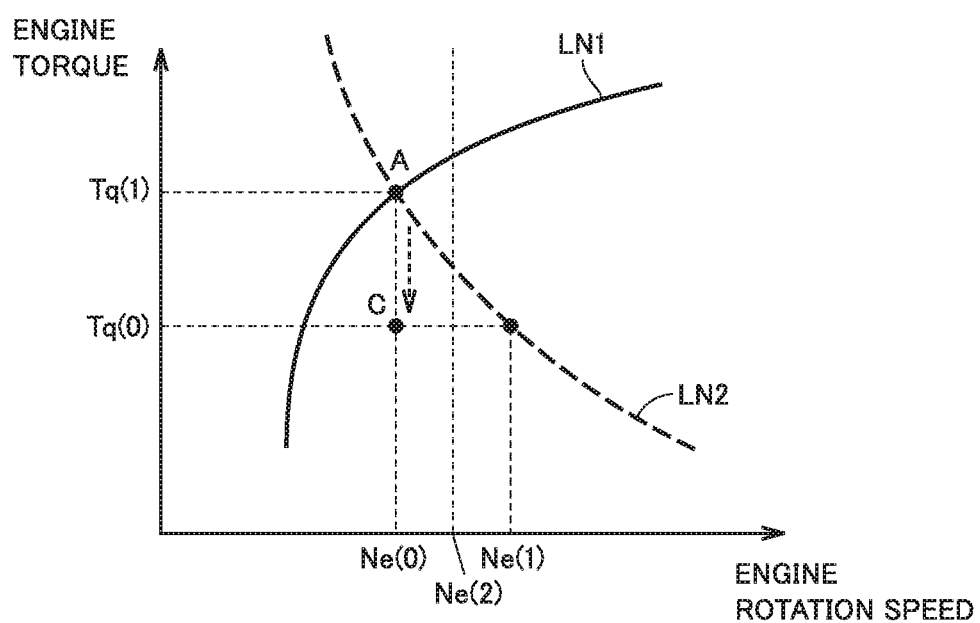
FIG. 7 is a diagram for illustrating an exemplary operation by the HV-ECU in the modification.

An operation by HV-ECU 62 in the modification will be described below with reference to FIG. 7. FIG. 7 is a diagram for illustrating an exemplary operation by HV-ECU 62 in the modification. The ordinate in FIG. 7 represents engine torque. The abscissa in FIG. 7 represents an engine rotation speed. LN1 and LN2 in FIG. 7 represent the predetermined operating line and the equal power line of (exemplary) requested engine power similarly to LN1 and LN2 in FIG. 5, respectively. FIG. 7 assumes, for example, that Ne(2) is set as the upper limit rotation speed.

When requested system power is calculated (S100) and when it is determined that a request for activation of engine 13 has been issued as calculated requested system power has exceeded the threshold value (YES in S102), requested engine power is calculated (S104) and a turbo temperature is obtained (S106).

When the obtained turbo temperature is determined as being higher than threshold value Ta (NO in S108), a value resulting from addition of a predetermined amount to the engine rotation speed corresponding to intersection A on the predetermined operating line (for example, Ne(1)) is calculated (S200).

Since the calculated value exceeds upper limit rotation speed Ne(2) (YES in S202), a point C on the lower torque side than intersection A on the predetermined operating line with the engine rotation speed being equal is set as the operating point (S204). In other words, point C at which the engine rotation speed attains to Ne(0) and engine torque attains to Tq(0) lower by a predetermined value than Tq(1) in the coordinate plane of engine torque and the engine rotation speed is set as the operating point.

Then, engine control is carried out based on requested engine power (S114) and MG control is carried out based on the set operating point (S116).

When point C is set as the operating point, engine torque output from engine 13 is lower than when intersection A is set as the operating point. Since increase in temperature of exhaust is consequently suppressed, increase in temperature of turbo charger 47 is suppressed. Therefore, increase in temperature of turbo charger 47 can be suppressed while the engine rotation speed exceeding the upper limit rotation speed is suppressed.

When a value resulting from addition of the predetermined amount to the engine rotation speed corresponding to the intersection between the predetermined operating line and the equal power line of requested engine power is equal to or smaller than upper limit rotation speed Ne(2) (NO in S202), the operating point is set on the higher rotation speed side along the equal power line (LN2 in FIG. 5) than the intersection on the predetermined operating line (S112).

The modification above may be carried out as being combined in its entirety or in part as appropriate.

Second Embodiment

A hybrid vehicle according to a second embodiment will be described below. Vehicle 10 according to the present embodiment is different from vehicle 10 according to the first embodiment described above partially in processing performed by HV-ECU 62. Vehicle 10 according to the present embodiment is otherwise the same in features as vehicle 10 according to the first embodiment described above and those features have the same reference characters allotted. Functions of those features are also the same and therefore detailed description thereof will not be repeated.

In the present embodiment, HV-ECU 62 is assumed to operate as below. Specifically, when a turbo temperature does not exceed threshold value Ta, HV-ECU 62 sets as the operating point, a position on the predetermined operating line set on the coordinate plane of engine torque and the engine rotation speed where engine power requested of engine 13 is output. When the turbo temperature exceeds threshold value Ta, HV-ECU 62 sets as the operating point, a position changed from the position set on the predetermined operating line toward the lower torque side with the engine rotation speed being equal. HV-ECU 62 compensates for shortage in driving force corresponding to lowering in engine torque from the position set on the predetermined operating line to the operating point by using second MG 15.

Figure 8:
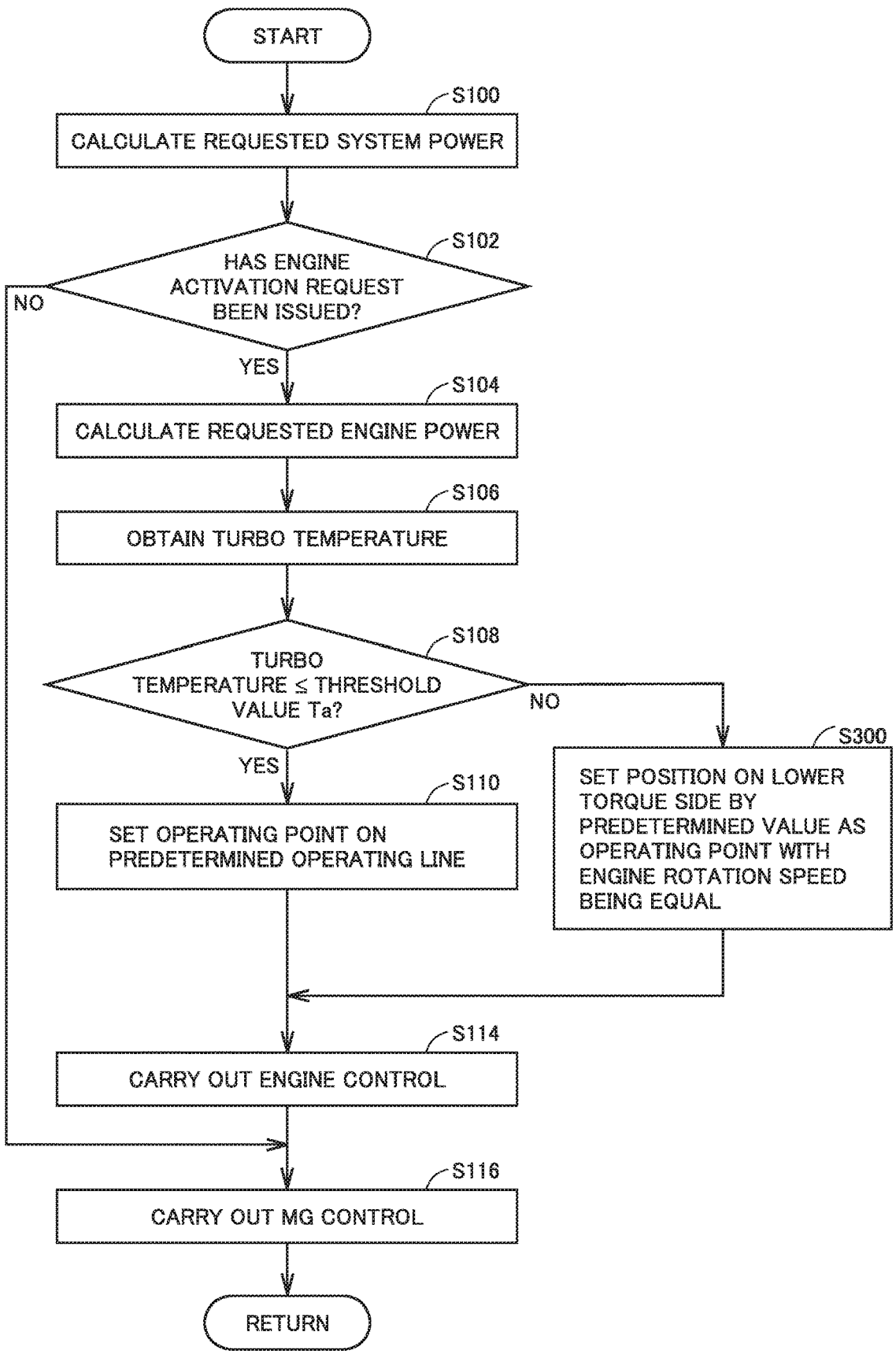
FIG. 8 is a flowchart showing exemplary processing performed by the HV-ECU in a second embodiment.

Processing performed by HV-ECU 62 in the present embodiment will be described below with reference to FIG. 8. FIG. 8 is a flowchart showing exemplary processing performed by HV-ECU 62 in the second embodiment.

Processing in S100, S102, S104, S106, S108, S110, S114, and S116 in the flowchart in FIG. 8 is similar to processing in S100, S102, S104, S106, S108, S110, S114, and S116 in the flowchart in FIG. 4 except for contents described below. Therefore, detailed description of such processing will not be repeated.

When the turbo temperature is determined as being higher than threshold value Ta in S108 (NO in S108), the process proceeds to S300.

In S300, HV-ECU 62 sets as the operating point, a position changed from the position on the predetermined operating line toward the lower torque side with the engine rotation speed being equal. HV-ECU 62 sets as the operating point, for example, a position lower in engine torque by a predetermined value than the intersection between the predetermined operating line and the equal power line of requested engine power. The predetermined value is set at least to suppress increase in turbo temperature. The predetermined value may be set, for example, to achieve engine torque at which a boost pressure is equal to or lower than the threshold value. Alternatively, the predetermined value may be set in accordance with a position of the intersection between the equal power line of requested engine power and the predetermined operating line.

Figure 9:
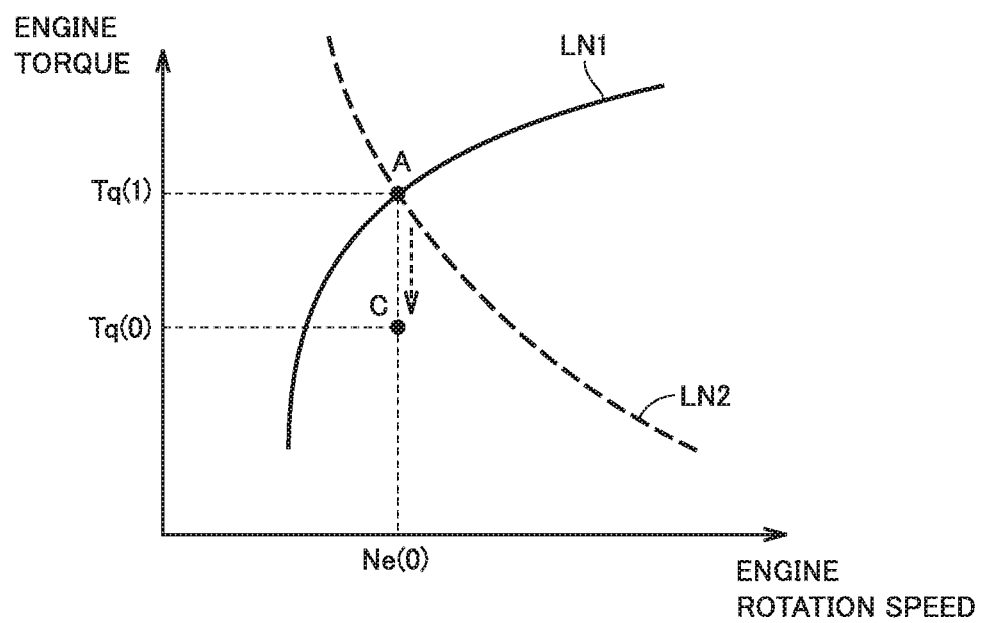
FIG. 9 is a diagram for illustrating an exemplary operation by the HV-ECU in the second embodiment.

An operation by HV-ECU 62 in this embodiment will be described below with reference to FIG. 9. FIG. 9 is a diagram for illustrating an exemplary operation by HV-ECU 62 in the second embodiment. The ordinate in FIG. 9 represents engine torque. The abscissa in FIG. 9 represents an engine rotation speed. LN1 and LN2 in FIG. 9 represent the predetermined operating line and the equal power line of (exemplary) requested engine power similarly to LN1 and LN2 in FIG. 5, respectively.

When requested system power is calculated (S100) and when it is determined that a request for activation of engine 13 has been issued as calculated requested system power has exceeded the threshold value (YES in S102), requested engine power is calculated (S104) and a turbo temperature is obtained (S106).

When the obtained turbo temperature is determined as being higher than threshold value Ta (NO in S108), point C on the lower torque side than intersection A between requested engine power and the predetermined operating line with the engine rotation speed being equal is set as the operating point (S300). In other words, point C at which the engine rotation speed attains to Ne(0) and engine torque attains to Tq(0) lower by a predetermined value than Tq(1) in the coordinate plane of engine torque and the engine rotation speed is set as the operating point.

Then, engine control is carried out based on requested engine power (S114) and MG control is carried out based on the set operating point (S116). In MG control, engine torque to be transmitted to drive wheel 24 and torque of second MG 15 result in generation of requested driving force.

When point C is set as the operating point, engine torque output from engine 13 is lower than when intersection A is set as the operating point. Since increase in temperature of exhaust is consequently suppressed, increase in temperature of turbo charger 47 is suppressed. Furthermore, shortage in driving force corresponding to lowering in engine torque is compensated for by second MG 15. Therefore, deterioration in drivability can be suppressed. Therefore, a hybrid vehicle that achieves suppressed deterioration in drivability while overheating of the turbo charger is suppressed and a method of controlling a hybrid vehicle can be provided.

As to Modification of Second Embodiment

A modification of the second embodiment will be described below.

In the embodiment described above, when the turbo temperature exceeds threshold value Ta, a position on the lower torque side than the intersection between the predetermined operating line and the equal power line of requested engine power with the engine rotation speed being equal is set as the operating point. For example, when the turbo temperature exceeds threshold value Ta, however, the operating point may be set such that magnitude of lowering in engine torque with the position on the predetermined operating line being defined as the reference increases with increase in turbo temperature. By doing so, engine torque is lowered as the turbo temperature is higher and hence increase in temperature of turbo charger 47 can be suppressed.

Though intake throttle valve 49 is described as being provided between intercooler 51 and intake manifold 46 in the embodiment above, it may be provided, for example, in intake air passage 41 between compressor 48 and air flow meter 50.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A hybrid vehicle comprising:
an engine including a turbo charger;
a motor generator that generates electric power by using motive power of the engine;
a power divider that divides motive power output from the engine into motive power to be transmitted to the motor generator and motive power to be transmitted to a drive wheel;
an obtaining device that obtains a temperature of the turbo charger; and
a controller that controls the engine and the motor generator based on the temperature of the turbo charger, wherein
when the temperature of the turbo charger does not exceed a threshold value, the controller sets as an operating point, a position on a predetermined operating line where engine power requested of the engine is output, the predetermined operating line being set on a coordinate plane of engine torque and an engine rotation speed,
when the temperature of the turbo charger exceeds the threshold value, the controller sets as the operating point, a position changed from the position set on the predetermined operating line toward a higher rotation speed side along an equal power line of the engine power, and
the controller controls the engine and the motor generator for the engine to operate at the set operating point.

2. The hybrid vehicle according to claim 1, wherein the controller sets the operating point to increase a rotation speed of the engine as the temperature of the turbo charger is higher.

3. The hybrid vehicle according to claim 1, wherein when the engine rotation speed corresponding to the position changed toward the higher rotation speed side exceeds an upper limit value, the controller sets as the operating point, a position changed from the position set on the predetermined operating line toward a lower torque side with the rotation speed of the engine being equal.

4. A hybrid vehicle comprising:
an engine including a turbo charger;
a first motor generator that generates electric power by using motive power of the engine;
a power divider that divides motive power output from the engine into motive power to be transmitted to the first motor generator and motive power to be transmitted to a drive wheel;
a second motor generator that transmits motive power to the drive wheel;
an obtaining device that obtains a temperature of the turbo charger; and
a controller that controls the engine, the first motor generator, and the second motor generator based on the temperature of the turbo charger, wherein
when the temperature of the turbo charger does not exceed a threshold value, the controller sets as an operating point, a position on a predetermined operating line where engine power requested of the engine is output, the predetermined operating line being set on a coordinate plane of engine torque and an engine rotation speed,
when the temperature of the turbo charger exceeds the threshold value, the controller sets as the operating point, a position changed from the position set on the predetermined operating line toward a lower torque side with the engine rotation speed being equal,
the controller controls the engine and the first motor generator for the engine to operate at the set operating point, and
the controller compensates for shortage in driving force corresponding to lowering in engine torque from the position set on the predetermined operating line to the operating point by using the second motor generator.

5. A method of controlling a hybrid vehicle, the hybrid vehicle including an engine including a turbo charger, a motor generator that generates electric power by using motive power of the engine, and a power divider that divides motive power output from the engine into motive power to be transmitted to the motor generator and motive power to be transmitted to a drive wheel, the method comprising:
obtaining a temperature of the turbo charger;
when the temperature of the turbo charger does not exceed a threshold value, setting as an operating point, a position on a predetermined operating line where engine power requested of the engine is output, the predetermined operating line being set on a coordinate plane of engine torque and an engine rotation speed;
when the temperature of the turbo charger exceeds the threshold value, setting as the operating point, a position changed from the position set on the predetermined operating line toward a higher rotation speed side along an equal power line of the engine power; and
controlling the engine and the motor generator for the engine to operate at the set operating point.

6. A method of controlling a hybrid vehicle, the hybrid vehicle including an engine including a turbo charger, a first motor generator that generates electric power by using motive power of the engine, a power divider that divides motive power output from the engine into motive power to be transmitted to the first motor generator and motive power to be transmitted to a drive wheel, and a second motor generator that transmits motive power to the drive wheel, the method comprising:
obtaining a temperature of the turbo charger;
when the temperature of the turbo charger does not exceed a threshold value, setting as an operating point, a position on a predetermined operating line where engine power requested of the engine is output, the predetermined operating line being set on a coordinate plane of engine torque and an engine rotation speed;
when the temperature of the turbo charger exceeds the threshold value, setting as the operating point, a position changed from the position set on the predetermined operating line toward a lower torque side with the engine rotation speed being equal;

controlling the engine and the first motor generator for the engine to operate at the set operating point; and compensating for shortage in driving force corresponding to lowering in engine torque from the position set on the predetermined operating line to the operating point by using the second motor generator.

\* \* \* \* \*